Sept. 30, 1930.  E. H. FOLEY  1,776,969
APPARATUS FOR PRODUCING UNITARY MOTION
PICTURES AND SOUND RECORD FILMS
Original Filed April 7, 1925  3 Sheets-Sheet 1
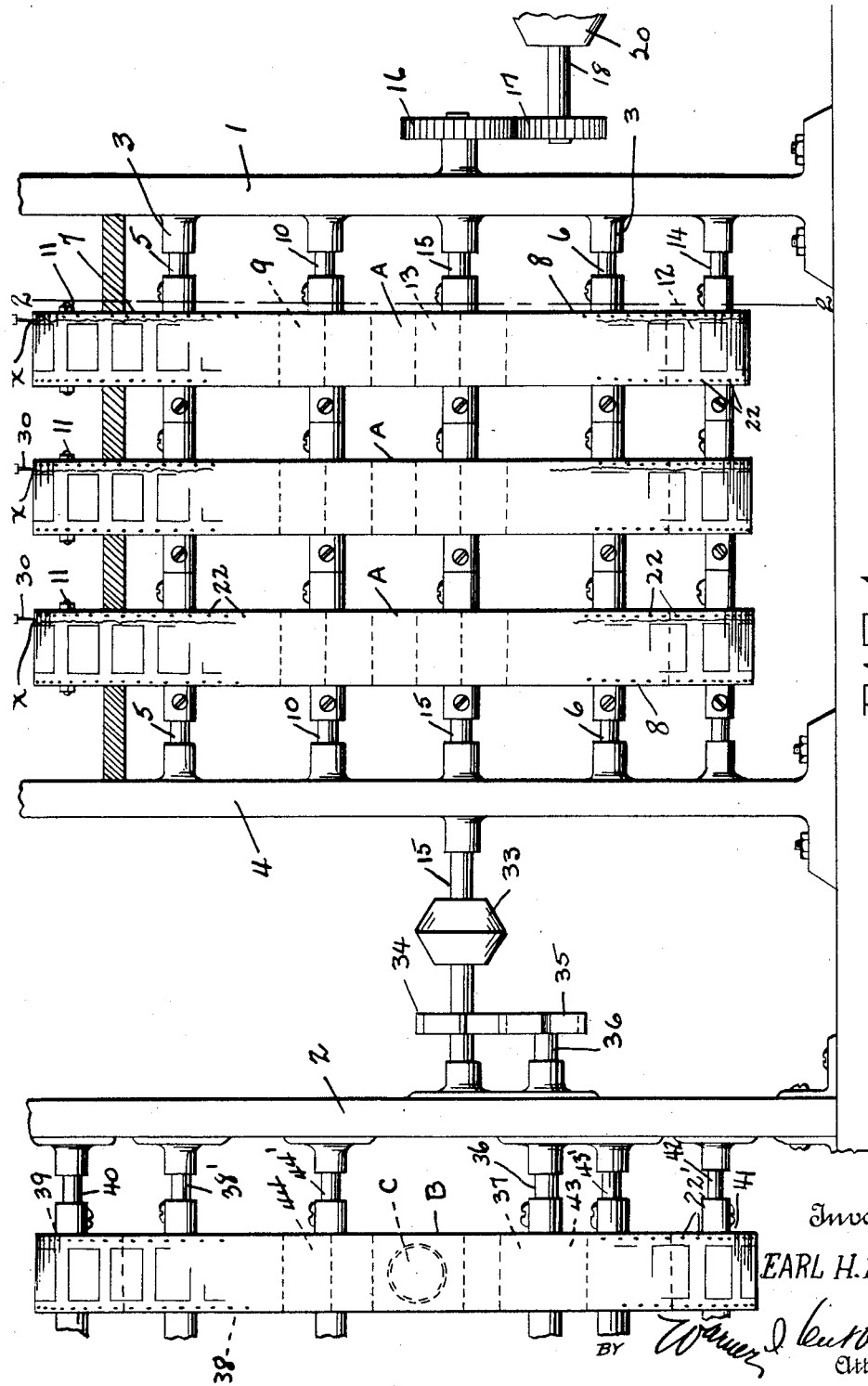

Sept. 30, 1930.
E. H. FOLEY
1,776,969
APPARATUS FOR PRODUCING UNITARY MOTION
PICTURES AND SOUND RECORD FILMS
Original Filed April 7, 1925    3 Sheets-Sheet 2
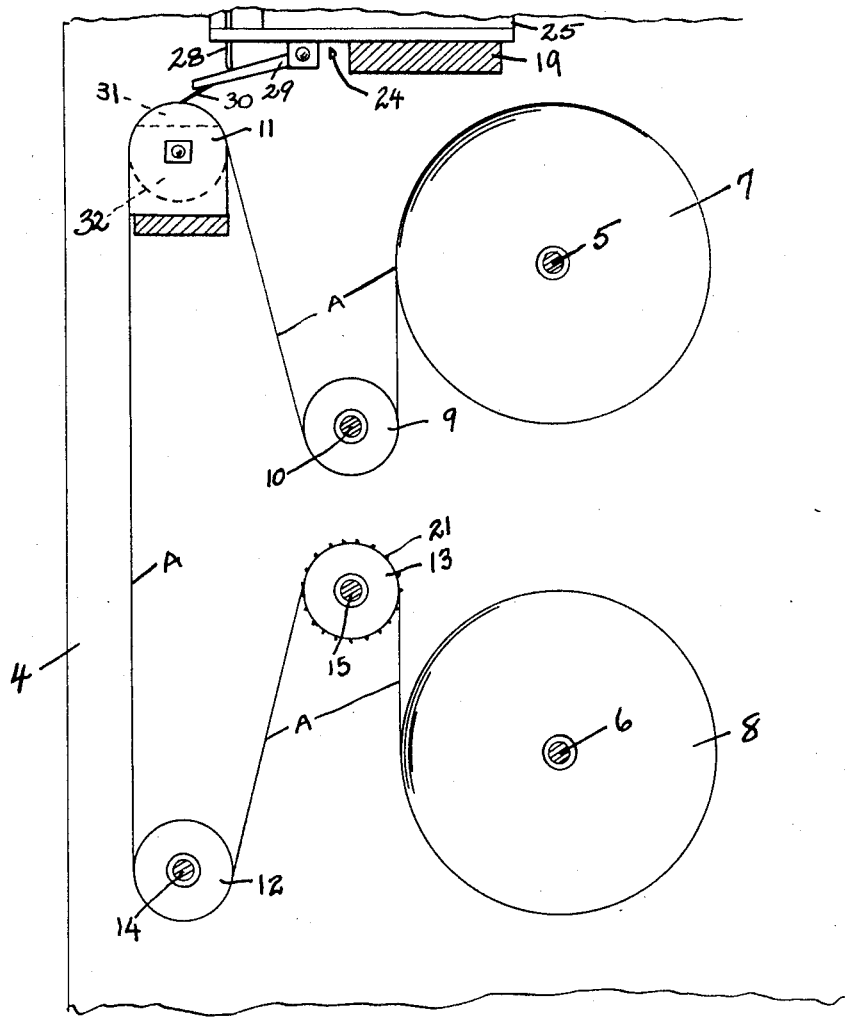
— FIG-2 —
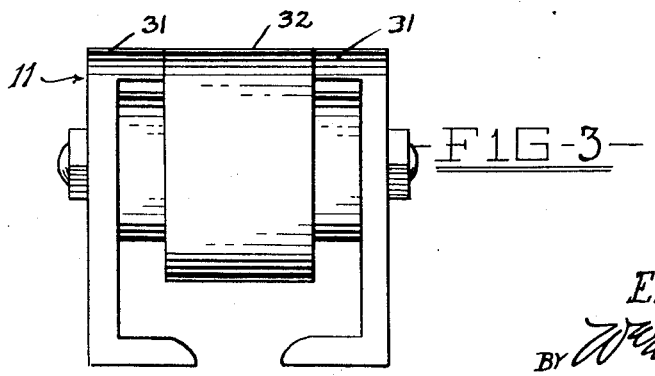
— FIG-3 —
Inventor
*EARL H. FOLEY.*

Inventor
EARL H. FOLEY,

Patented Sept. 30, 1930

1,776,969

UNITED STATES PATENT OFFICE

EARL H. FOLEY, OF ASTORIA, LONG ISLAND CITY, NEW YORK, ASSIGNOR OF NINETY-NINE PER CENT TO SOUND FILMS CORPORATION, OF TACOMA, WASHINGTON, A CORPORATION OF WASHINGTON

APPARATUS FOR PRODUCING UNITARY MOTION PICTURES AND SOUND-RECORD FILMS

Substitute for application Serial No. 21,376, filed April 7, 1925. This application filed September 28, 1929.
Serial No. 395,977.

In general terms, my present invention has reference to improvements in means and apparatus for effecting with absolute accuracy the synchronous recordation and reproduction of motion pictures and sounds accompanying the same, such for instance as the words of actors, sounds emanating from natural or artificial scenic effects, music and the like; and more particularly it is my purpose to simultaneously expose one or more reels or negative motion picture films and produce a sound record directly upon any reasonable number of reels of corresponding positive films so that when the positive films are developed from the exposed negative films or film absolute synchronism of both sound and scene will be attained. By so accomplishing the accurate and direct recordation and synchronism upon a single finished film or record body of both sound and scene, the defects present in previously known devices of a similar character are eliminated and a faithful representation of spoken drama and the like attained.

The present application is a substitute for my abandoned application filed April 7th 1925, Serial #21,376, on the same subject matter.

In order to attain in the simplest and most practical manner the purposes of my present invention I utilize for the purpose of recording sound that portion of a positive film for motion pictures which lies adjacent to the ends of the picture fields of such reel. The negative film or films and the several positive films are arranged in my improved apparatus and run simultaneously and in absolute synchronism with respect to the fields thereof, and a direct sound record produced upon each of the positive films adjacent to each of the fields thereof corresponding to the field or fields of the negative film or films being then exposed. Not only is my invention particularly advantageous from the standpoint of synchronous recordation and reproduction, but the sound record so produced is direct and therefore of finer quality than has heretofore been attained.

Other, and equally important objects of my invention may be briefly defined as follows; first, I have provided means whereby my films are run at an absolutely uniform rate of speed thereby preventing variations in pitch and the like; second, I have combined in my apparatus improved magnetic recording devices of the type defined in my co-pending application Serial #732,225, with unique non-frictional recording arcs of the type shown in my co-pending application Serial #36,636 and here again described; third, my apparatus includes a common means for actuating both the positive and negative film mechanism, and fourth, the separate parts of my apparatus are so arranged that maximum effectiveness is attained without sacrificing compactness and simplicity.

The particular elements of my recording apparatus employed to accomplish the objects attributed to it will be hereinafter more fully described in detail and specifically pointed out in the claims appended hereunto and forming a part of this specification.

In the accompanying drawings wherein is illustrated the preferred embodiment of my apparatus:—

Figure 1 is a front view of my apparatus showing the relative arrangement of the several parts, and the manner in which the films are operated upon thereby.

Figure 2 is a diagrammatic showing taken on line 2—2 of Figure 1.

Figure 3 is a front view of my recording arc.

In the drawings wherein like characters of reference designate like or similar parts throughout the several views:—

Figure 5:
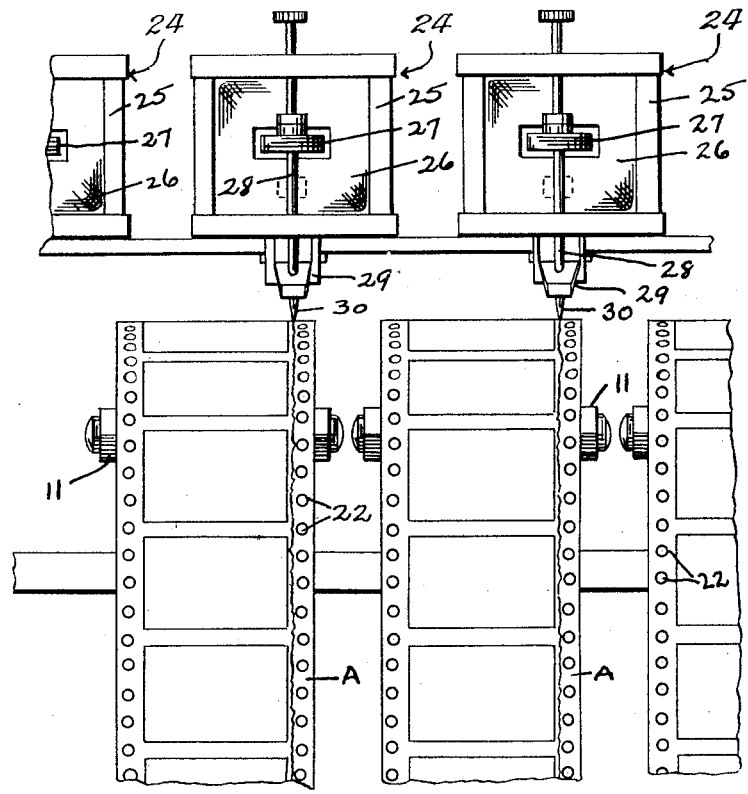

The numeral (1) designates one end plate of my supporting structure which same is preferably mounted in a cabinet or housing (not shown) preferably formed with a partitioning member here fragmentarily shown at (2).

Mounted with one of their ends journalled in bearings (3) carried by the end plate (1) and their remaining ends in supplementary supports (4) are upper and lower shafts (5) and (6) upon which are mounted respectively a plurality of positive motion picture film reel storage drums (7) and re-wind drums (8). The positive picture films A are each trained beneath one of the idler pulleys (9) carried on a shaft (10) which is also journalled in bearings on the end plate (1) and supplementary support (4). The films A are each then trained over recording arcs (11) of the type defined in my copending application Serial #36,636 and downwardly under pulleys (12), and then upwardly over drive pulleys (13); the respective pulleys being mounted on shafts (14) and (15) respectively. The said shafts (14) and (15) are journalled in bearings carried by the end plate (1) and support (4), and from the rollers (13) the respective films are fed to the rewind drums (8). The idler pulleys hereinbefore referred to function to take up slack and properly feed the respective films from the storage to the re-wind drums. The shaft (15) carrying the drive pulleys (13) is extended through the end plate and has mounted thereon a gear wheel (16) which is engaged by a drive gear (17) on drive shaft (18) of the power unit (not shown). A suitable governor speed control device here conventionally illustrated at (20) is mounted on the drive shaft (18) to insure an absolutely uniform rate of speed of rotation, and the pulleys (13) are of course suitably keyed to shaft (15) to rotate therewith.

In order to effectively draw the films from one drum to the other the pulleys (13) are formed with small, spaced teeth (21) around their peripheries which engage the usual holes or openings (22) provided for that purpose in the present type of motion picture film. Mounted on a longitudinal support (19) extending from support (4) to end plate (1) and above the arcs (11) are a plurality of magnetic sound record recording devices adapted to cut grooves of the hill-and-dale type and generally designated by (24) of the type defined in my co-pending application Serial #732,225, in which the film is moved against the cutting stylus which is held at an acute angle to the film and each of these recording devices includes a permanent magnet (25), a coil (26), an armature (27), and a detent (28) from the armature and engaging a stylus assembly (29). The respective styluses (30) of each recording device engage the positive films drawn there-beneath over the arcs (11) at points adjacent to the fields thereof after the manner shown in Figure 5, and as each arc is formed with fixed anvils (31) at either side of their respective roller members (32) records are engraved thereon with facility at the portion of each film engaging an anvil; the body of the film bearing the picture fields engage the rollers of the arcs and consequently scratching or abrasion of the body of the film is prevented.

The drive shaft (15) extends through the support (4) and has mounted thereon a suitable governor speed control device (33), and an intermittent motion sprocket (34) which is intergeared with a cooperating sprocket (35) on driven shaft (36) journalled in the partitioning member (2) so that shafts (15) and (36) rotate in the same direction. The shaft (36) has mounted thereon a pulley (37), or pulleys in case more than one negative film is desired to be exposed, having spaced teeth similar to those of pulleys (13) engaging in holes or openings (22′) in the negative picture film B. Film B is fed from the storage drum (38) on shaft (38′) under idler pulley (44) on shaft (44′) and over idler pulley (39) on shaft (40). It is then trained under idler pulley (41) on shaft (42) and then over drive pulley (37) down on the re-wind drum (43) on shaft (43′) after the manner heretofore described with reference to the construction and operation of the apparatus acting upon positive film A.

The point of exposure of the respective fields of the negative film B is indicated conventionally by the conventional representation of a lens C and obviously the camera mechanism may be of any suitable design now on the market for the taking of motion pictures.

The method and apparatus heretofore described for feeding the positive film A by my apparatus is synchronized in the manner defined with the feeding of the negative film B so that the points X of the respective positive films adjacent to any one field correspond in point of time with the moment of exposure of the corresponding field of the negative film B, thereby insuring perfect harmony between photographing of scene and recording of sounds accompanying the same.

Figure 4:
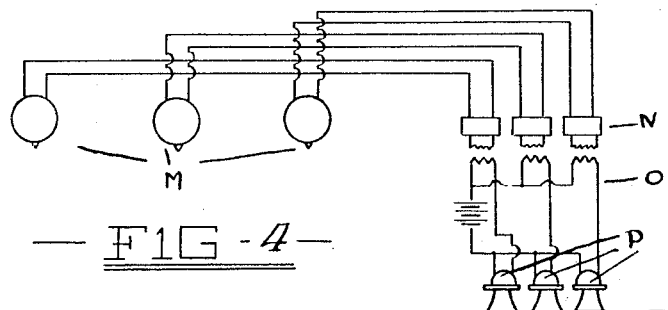
Figure 4 is a wiring diagram showing one method of hooking up my magnetic recording means with sound amplifying means and microphones, and Figure 5 a detail view of the recording means associated with the positive films.

Referring now to the wiring diagram shown in Figure 4; I provide, preferably, a number of recording devices M equivalent to the number of positive films desired to be engraved with a sound record (it is quite possible, and sometimes desirable to utilize but one microphone to serve all of the magnetic devices). Each recorder is connected in an electrical circuit with an amplifying unit N. The transmitting devices P are preferably connected in parallel (although it is possible to connect them in series) as at O, and are in circuit with the amplifying units. Thus sound impulses acting on the microphones will be amplified and translated by the magnetic recording devices into the desired records on the respective positive films.

In operation, of course, any reasonable number of positive films may be provided with a direct sound record, and upon completion from the negative be distributed for reproduction among various motion picture houses. It may also be remarked that instead of frictional recording of sound with my magnetic recording devices, non-frictional means may be used of the type defined in my prior patent granted November 8th, 1921, Number 1,396,178. While my apparatus is here described as mounted in a two part cabinet, a separate and distinct photographing or camera chamber is not a necessity since the entire apparatus both for the recording of sound and photographing of scene may be mounted in a single light proof cabinet without partitions.

While in the foregoing, there has been illustrated and described such combination and arrangement of elements as constitute the preferred embodiments of my invention, it is nevertheless desired to emphasize the fact that interpretation of the invention should only be conclusive when made in the light of the subjoined claims.

I claim:—

1. Apparatus for synchronizing simultaneous photographing and recordation of scene and sound comprising means for simultaneously photographing pictures upon a negative motion picture film, means for producing a sound record directly upon a positive motion picture film adjacent the picture field, said means including synchronized feed devices for effecting in point of time the simultaneous exposure of the fields of the negative film and the production of a sound record adjacent each corresponding field of the positive film.

2. Apparatus for synchronizing simultaneous photographing and recordation of scene and sound comprising feed devices for moving both positive and negative motion picture films in synchronism, sound recording devices engaging each positive film at a point adjacent the picture fields thereof, and means for exposing the respective fields of the negative film synchronously with the movement of the corresponding fields of the positive films beneath the respective recording devices.

3. The hereinbefore described method consisting in the synchronous exposure of the fields of negative motion picture films, and the recording of sound records upon each of several positive motion picture films driven synchronously with said negative picture films, and adjacent the picture fields, and then printing on the positive film or films the pictures taken on the negatives whereby to produce a combined picture and sound record film.

4. The hereinbefore described method consisting in the synchronous exposure of the fields of negative motion picture films, and the recording of sound records directly upon positive motion picture films driven synchronously at points adjacent each of the fields thereof corresponding in point of time in exposure of the respective fields of the negative picture film, and then printing on the positive film or films the pictures taken on the negatives whereby to produce combined picture and sound record films.

In testimony whereof, I affix my signature hereunto.

EARL H. FOLEY.